Aug. 8, 1967  E. R. PHILLIPS  3,334,640

JET PIPE PNEUMATIC AND GATE

Filed Aug. 1, 1962

INVENTOR.
EDWIN R. PHILLIPS

BY

ATTORNEY

United States Patent Office 3,334,640
Patented Aug. 8, 1967

3,334,640
JET PIPE PNEUMATIC AND GATE
Edwin R. Phillips, Westport, Conn., assignor to Sperry Rand Corporation, New York, N.Y., a corporation of Delaware
Filed Aug. 1, 1962, Ser. No. 214,021
11 Claims. (Cl. 137—81.5)

This invention relates generally to the field of logical devices. More particularly the invention relates to a fluid device capable of performing the logical And function.

Mechanization of various logical operations, such as And, Or, Not, etc. are, of course, well known using such components as electron tubes, solid state devices, relays, etc. The present invention provides a fluid unit which is capable of effecting the logical And function, which unit has all of the normal advantages attendant with the use of fluid devices, i.e., reliability, low cost, no problem of heat dissipation, and absence of moving parts. In addition, the logical structure of this invention is extremely simple and requires no critical tolerances in its fabrication since it uses fluid jet phenomena and does not make use of the "boundary effect."

In general, a logical And unit may be defined as one which will provide an output of a certain level in response to coincident input signals of that level at all of the input terminals provided. Thus, if the device in question has two, three, or four, etc. input terminals, then signals must be present at each of them to provide the desired output. The device of this invention is illustrated using as its operative signals a jet of air though other fluids are suitable. The output signal in the embodiment shown is reflected as the presence of a fluid pressure.

Accordingly, it is an object of this invention to provide an improved logical And unit.

It is a further object of this invention to provide an improved fluid And unit.

It is a further object of this invention to provide a fluid And unit which requires no critical tolerances in fabrication.

It is still a further object of this invention to provide a fluid And unit wherein selected orifices serve both as input and exhaust ports.

Other and further objects and advantages of the invention will become apparent when the following description is read in conjunction with the accompanying drawings.

Briefly stated, in its simplest form the invention comprises a duct having a dual function orifice at each end. Each orifice is capable of transmitting an externally generated fluid jet to the interior of the duct or, if no such jet is present, evacuating fluid from the duct when the pressure therein exceeds the ambient or reference pressure. As long as there is no fluid jet applied to either of the orifices obviously no pressure will be present within the duct. Similarly, if a fluid jet is applied to only one of the orifices it can evacuate through the other dual function orifice, again preventing the buildup of pressure inside the duct. However, in the situation where externally generated fluid jets are applied to both input orifices coincidently, pressure within the duct will build up rapidly, each of the input jets effectively closing its associated orifice. This internal pressure will be reflected at an output orifice.

Figure 1:
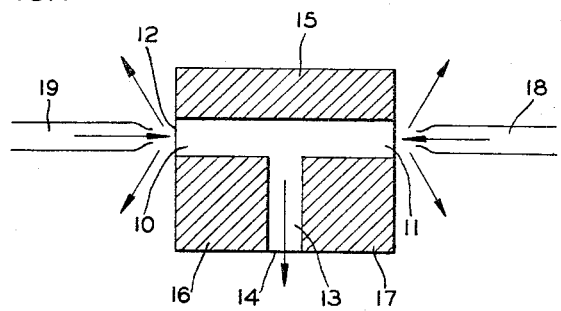
FIG. 1 is a cross-sectional view of a simplified two input embodiment of the invention.

Referring now to FIG. 1, a basic embodiment of a fluid And gate of the invention is shown having a duct 10 with first and second dual function orifices respectively numbered 11 and 12. A passage 13 is provided communicating with duct 10, and the output of the unit is observed at passage end 14. Duct 10 and passage 13 are defined by walls 15, 16 and 17. The unit has been satisfactorily constructed by scoring appropriate channels on a metal, plastic or glass plate and covering that plate with a second plate, the two being sealed together, though other methods of construction are equally suitable.

Adjacent each of input orifices 11 and 12 are means for providing a jet of fluid such as air, indicated by reference numerals 18 and 19. These jet producing means may be fixed to some support which is not shown. When a jet is provided through either of means 18 or 19 the presence of fluid at that point at least partially seals the associated dual function orifice 11 or 12 preventing or decreasing evacuation of the fluid therethrough. If only one of means 18 or 19 provides a jet at a particular time, the fluid thus introduced will evacuate readily through the other dual function orifice preventing buildup of pressure in duct 10 and providing no output at end 14 through passage 13. However, when a jet is provided at both of orifices 11 and 12 simultaneously, fluid thus introduced into duct 10 can less easily evacuate past either of orifices 11 and 12 and pressure buildup in duct 10 is reflected by pressure at end 14 through passage 13.

By using the same orifice as both an input and an exhaust port (i.e. dual function), the basic And function can be achieved with a minimum of construction. The only requirements imposed by the invention are:

(1) An unused dual function orifice must permit sufficient evacuation therethrough to keep the output orifice pressure below a chosen level.

(2) The fluid jet, when present at all dual function orifices, must prevent evacuation therethrough to an extent sufficient to raise the pressure at the output orifice at least to said chosen level.

Figure 2:
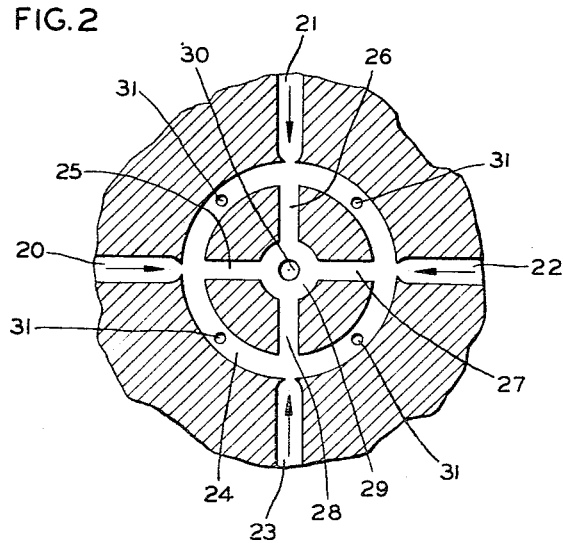
FIG. 2 is a cross-sectional view of a simplified multiple input embodiment of the invention.

Referring now to FIG. 2, an extension of the idea which is embodied in the structure of FIG. 1 is shown. The unit illustrated has 4 dual function orifices although a greater or lesser number may be chosen as desired. The four dual function orifices are labeled 20, 21, 22, and 23 respectively and communicate with an exhaust annulus 24. Passages 25, 26, 27 and 28, are respectively associated with dual function orifices, 20, 21, 22 and 23, each dual function orifice and its associated passage being located directly across exhaust annulus 24, or "in line." An output port 30 communicates with a recovery chamber 29, and as is shown, is substantially at right angles to the plane of the paper and to the plane of passages 25, 26, 27 and 28. Though the dual function orifices 20–23 are shown substantially adjacent the passages 25–28, this is not essential but is preferable. Neither is it essential that output port 30 be located as defined above but again this is preferable.

One or more exhaust ports 31 are provided in annulus 29. In this embodiment 4 are shown. Dual function orifices 20–23 are dimensioned relative to associated passages 25–28 and the distance between each orifice and its passage is such that when a jet is present at a dual function orifice it effectively seals its associated passage. This prevents fluid flow from recovery chamber 29 through any "jet-sealed" passage to exhaust annulus 29 and thence to the reference pressure via ports 31.

When input jets are coincidently present at all of dual function orifices 20–23, each of passages 25–28 is effectively sealed, the pressure in chamber 24 rises rapidly and this is reflected at output port 30.

As will be appreciated, the embodiment of FIG. 2 has a relatively higher "noise" level at port 30 when some but not all inputs are present than does the embodiment of FIG. 1. However, even the worst case, i.e. all but one input present, causes an output pressure at port 30 five times less than when all inputs are present. This difference is well within acceptable limits of tolerance.

While what has been shown and described is presently believed to be the best mode and a preferred embodiment of the invention, modifications and variations thereof may be made therein, as will be clear to those skilled in the art. Accordingly, the scope of the invention is intended to be limited solely by the appended claims.

I claim:

1. A fluid And unit including a duct, a plurality of dual function orifices formed in said duct, each of said dual function orifices permitting therethrough the equalization of fluid pressure between said duct and a reference fluid pressure, means for selectively changing the reference pressure at one or more of said orifices, and an output passage communicating between said reference pressure and said duct, said output passage reflecting a chosen level of change from said reference pressure only when all of said dual function orifices coincidently exhibit said change.

2. A fluid And unit including a duct, a plurality of dual function orifices formed in said duct and communicating with a reference fluid pressure, said dual function orifices lying in substantially parallel planes, each of said dual function orifices permitting therethrough the equalization of pressure between the fluid pressure within said duct and said reference fluid pressure, means for selectively changing said reference fluid pressure at one or more of said dual function orifices, and an output passage formed in said duct communicating with said reference fluid pressure, said output passage lying in a plane not parallel to the planes of said dual function orifices, said output passage exhibiting a chosen level of change from said reference fluid pressure only when all of said dual function orifices coincidently are changed from said reference fluid pressure in the same direction.

3. The unit defined in claim 2 wherein the plane of said output passage is substantially orthogonal to the planes of said dual function orifices.

4. A fluid And unit including a duct, a plurality of dual function orifices formed in said duct and communicating with a source of reference fluid pressure, said dual function orifices lying in substantially parallel planes, each of said dual function orifices permitting therethrough the equalization of pressure between fluid pressure within said duct and said reference fluid pressure, a fluid jet source operatively positioned relative to each of said dual function orifices and external to said duct, control means for selectively introducing a jet of fluid within said duct from one or more of said jet means through their respective associated dual function orifices, and an output passage formed in said duct and communicating with said source of reference fluid pressure, said output passage lying in a plane substantially orthogonal to the planes of said dual function orifices, said output passage exhibiting a chosen level of change from said reference fluid pressure only when all of said dual function orifices coincidently have fluid jets applied thereto from their said associated jet sources.

5. A fluid logic device including:
 (a) a continuous closed duct;
 (b) a plurality of radially disposed dual function orifices communicating with said duct;
 (c) an output passage communicating with said duct;
 (d) said output passage being substantially at right angles to said dual function orifices;
 (e) said dual function orifices and said output passage being arranged so that a chosen level of fluid pressure will exist at said output passage only while fluid pressure is coincidently applied to each of said dual function orifices.

6. A fluid logic device including:
 (a) a recovery chamber;
 (b) an annulus concentric to said recovery chamber;
 (c) a plurality of ducts communicating between the inner wall of said annulus and the outer wall of said chamber;
 (d) a dual function orifice associated with each of said ducts and communicating through the outer wall of said annulus;
 (e) an output port communicating with said recovery chamber;
 (f) at least one exhaust port formed in said annulus and communicating with a source of reference pressure;
 (g) said orifices, ports, ducts and annulus being arranged and constructed so that fluid pressure of a chosen level will be present at said output port only while fluid pressure is coincidently present at each of said input orifices.

7. A fluid logic device including:
 (a) an annulus;
 (b) a recovery chamber located substantially at the center of said annulus;
 (c) a plurality of ducts radially disposed relative to said annulus and said chamber and communicating therebetween;
 (d) at least two dual function orifices formed in said annulus, each associated with one of said ducts;
 (e) at least an exhaust port formed in said annulus and communicating with a source of reference pressure;
 (f) an output port formed in said chamber and located in a plane substantially orthogonal to the plane of each of said ducts;
 (g) said ducts, ports, annulus, orifices and chamber being arranged and constructed so that fluid pressure is present at said output port only following coincident application of fluid jets to each of said dual function orifices.

8. A fluid And unit including a closed duct, a plurality of dual function orifices formed in said duct and communicating with a source of reference fluid pressure, a source selectively providing a jet of fluid operatively associated with each of said dual function orifices, a chamber, a plurality of passages communicating between the interior of said duct and the interior of said chamber, an output port formed in said chamber and communicating with said source of reference fluid pressure, and at least one exhaust port formed in said duct.

9. A fluid And unit including a closed duct, a plurality of dual function orifices formed in said duct and communicating with a source of reference of fluid pressure, a source selectively providing a jet of fluid operatively associated with each of said dual function orifices, a chamber, a corresponding passage communicating between the interior of said duct and the interior of said chamber for each of said dual function orifices, said passages being located on the opposite wall of said duct from said dual function orifices and arranged to receive substantially all of the fluid jet provided by its said associated jet source when it is actuated, an output port formed in said chamber and communicating with said source of reference fluid pressure, and at least one exhaust port formed in said duct and communicating with said source of reference pressure.

10. The unit defined in claim 9 wherein said passages are radially disposed and substantially coplanar, said output orifice being located in a plane substantially orthogonal to the plane of said passages.

11. The unit defined in claim 10 wherein each of said dual function orifices is in-line with its said associated passage.

References Cited

UNITED STATES PATENTS

| | | | |
|---|---|---|---|
| 3,068,880 | 12/1962 | Riordan | 137—608 X |
| 3,107,850 | 9/1963 | Warren et al. | 137—81.5 |

FOREIGN PATENTS

| | | |
|---|---|---|
| 122,346 | 9/1959 | Russia. |

M. CARY NELSON, *Primary Examiner.*

LAVERNE D. GEIGER, S. SCOTT, *Assistant Examiners.*

UNITED STATES PATENT OFFICE
CERTIFICATE OF CORRECTION

Patent No. 3,334,640                         August 8, 1967

Edwin R. Phillips

It is hereby certified that error appears in the above numbered patent requiring correction and that the said Letters Patent should read as corrected below.

Column 3, line 26, after "duct" insert -- and arranged to issue impinging fluid streams --; line 32, after "duct" insert -- intermediate said orifice --; line 45, after "passage" insert -- having its axis --; same line 45, strike out "not"; line 51, after "plane" insert -- of the axis --; column 4, line 2, after "closed" insert -- annular --.

Signed and sealed this 20th day of August 1968.

(SEAL)
Attest:

Edward M. Fletcher, Jr.                        EDWARD J. BRENNER
Attesting Officer                               Commissioner of Patents